US012801128B2

(12) United States Patent
Vasavada et al.

(10) Patent No.: US 12,801,128 B2
(45) Date of Patent: Nov. 17, 2026

(54) SYSTEM AND METHOD FOR DETERMINING DEFECT REGIONS OF PRODUCTS IN A MANUFACTURING PROCESS

(71) Applicant: TVARIT GMBH, Frankfurt am Main (DE)

(72) Inventors: Jiteshkumar Pareshkumar Vasavada, Pune (IN); Sanjay Shekhawat, Nagaur (IN); Naga Sai Pranay Modukuru, Stuttgart (DE); Rahul Prajapat, Frankfurt am Main (DE); Kamal Galrani, Neu Isenburg (DE); Rishabh Agrahari, Pune (IN); Alwin Varghese, Kozhikode (IN)

(73) Assignee: TVARIT GMBH, Frankfurt am Main (DE)

( * ) Notice: Subject to any disclaimer, the term of this patent is extended or adjusted under 35 U.S.C. 154(b) by 587 days.

(21) Appl. No.: 18/344,953

(22) Filed: Jun. 30, 2023

(65) Prior Publication Data

US 2024/0004376 A1 Jan. 4, 2024

(30) Foreign Application Priority Data

Jun. 30, 2022 (IN) ............................. 202241037543

(51) Int. Cl.
*G05B 19/418* (2006.01)

(52) U.S. Cl.
CPC . *G05B 19/41875* (2013.01); *G05B 19/41885* (2013.01)

(58) Field of Classification Search
CPC ........ G05B 19/41875; G05B 19/41885; G05B 2219/32193; G05B 2219/32194
See application file for complete search history.

(56) References Cited

U.S. PATENT DOCUMENTS

2019/0391562 A1* 12/2019 Srivastava ............. B23Q 15/04
2020/0159886 A1 5/2020 ReMine et al.
(Continued)

FOREIGN PATENT DOCUMENTS

KR 102521892 B1 4/2023

OTHER PUBLICATIONS

Optimisation of manufacturing process parameters for variable component geometries using reinforcement learning; https://www.sciencedirect.com/science/article/pii/S0264127522000442; Materials & Design—vol. 214, Feb. 2022, 110423.

*Primary Examiner* — Yossef Korang-Beheshti
(74) *Attorney, Agent, or Firm* — Jason C. Cameron

(57) ABSTRACT

A computer-implemented method for determining defect regions of products in a manufacturing process, is disclosed. The computer-implemented method includes steps of: obtaining experimental data from a machine; (b) obtaining first geometry data associated with historical products; (c) computing first geometrical parameters, based on the first geometry data associated with the historical products, by a geometry model; (d) computing second geometrical parameters, based on second geometry data associated with new products, by the geometry model; and (e) determining the defect regions in the new and historical products, based on the computed statistical features associated with defect types and locations, and the first and second geometrical parameters, by a machine learning model. The machine learning model is configured to determine the optimized recipe parameter to reduce the defect in at least one of: the new products and the historical products.

16 Claims, 12 Drawing Sheets

(56) References Cited

U.S. PATENT DOCUMENTS

| | | | | |
|---|---|---|---|---|
| 2020/0192990 | A1* | 6/2020 | Abad | G06F 30/23 |
| 2020/0272129 | A1 | 8/2020 | Crothers et al. | |
| 2021/0178697 | A1* | 6/2021 | Nilakantan | G06Q 10/06 |
| 2021/0216674 | A1 | 7/2021 | Hiller et al. | |
| 2021/0406441 | A1* | 12/2021 | Oberai | G06F 30/27 |
| 2022/0172258 | A1* | 6/2022 | Jain | G06F 40/117 |

* cited by examiner

900A

| Product | S/V 902 | Mass 904 | Crinkliness 906 | Compactness 908 | volume/ BB_Volume 910 | PM_X /PM_Y 912 | PM_X /PM_Z 914 |
|---|---|---|---|---|---|---|---|
| **Historical Product-1** | 0.27056 | 3056399 | 8.11821897 | 1.65259E-05 | 0.042652312 | 1.470474337 | 1.470661492 |
| **Historical Product-2** | 0.35071 | 1102874 | 7.49338123 | 2.10143E-05 | 0.032565256 | 1.739967307 | 1.740209201 |
| **Historical Product-3** | 0.31437 | 3232959 | 9.61212453 | 9.9561E-06 | 0.010947852 | 1.600956363 | 1.600975307 |
| **New Product** | 0.21647 | 3338434 | 6.68993328 | 2.95313E-05 | 0.100877738 | 1.624141015 | 1.624152245 |

FIG. 9A

900B

| | **Similarity Index** |
|---|---|
| **Historical Product-1** | 0.95 |
| **Historical Product-2** | 0.90 |
| **Historical Product-3** | 0.89 |

FIG. 9B

SYSTEM AND METHOD FOR DETERMINING DEFECT REGIONS OF PRODUCTS IN A MANUFACTURING PROCESS

EARLIEST PRIORITY DATE

This application claims priority from a Provisional patent application filed in India having Patent Application No. 202241037543, filed on Jun. 30, 2022, and titled "METHOD TO INTEGRATE GEOMETRIC INFORMATION WITH AN ARTIFICIAL INTELLIGENCE MODEL DEVELOPED FOR MANUFACTURING PROCESS

FIELD OF INVENTION

Embodiments of the present disclosure relate to machine learning (ML)/artificial intelligence (AI) based systems and more particularly relate to a system and method for determining one or more defect regions of one or more products in a manufacturing process based on integration of geometry data associated with the one or more products with a machine learning model.

BACKGROUND

Typically, mechanical products undergoes multiple manufacturing processes in order to achieve a final shape of the mechanical products. The manufacturing processes involve a plurality of steps including at least one of: material melting, casting, forming, machining, and the like. An initial stage of producing a mechanical product involves analyzing input and output geometries resulting from the manufacturing process.

Subsequently, steps including computer aided design (CAD) modeling, process selection, tool design, and process optimization through physics-based simulations, are carried out. Current solutions aim to optimize a process and tool design by utilizing physics-based simulations. The physics-based simulations consider factors including at least one of: product geometry, set parameters, and diverse boundary conditions specific to the manufacturing process.

In addition to the physics-based simulations, there are alternative approaches that leverage artificial intelligence techniques to optimize process parameters and minimize defective products in the manufacturing process. The above said approaches rely on inputting set parameters and actual values acquired from various sensors into an artificial intelligence model. However, it is worth noting that the artificial intelligence models never incorporated crucial information regarding the product geometry as part of input data of the artificial intelligence models. Therefore, minimizing the defective products and also predicting a quality of the products, are still not met by the artificial intelligence models.

Therefore, there is a need for an improved system and method for determining one or more defect regions of one or more products in a manufacturing process, to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with one embodiment of the disclosure, a computer-implemented method for determining one or more defect regions of one or more products in a manufacturing process, is disclosed. The computer-implemented method includes obtaining, by one or more hardware processors, one or more experimental data from a machine. The one or more experimental data comprise at least one of: recipe data, one or more measured parameters, data associated with one or more defect types and locations, and metadata.

The computer-implemented method further includes computing, by the one or more hardware processors, one or more statistical features based on the one or more experimental data obtained from the machine, by a feature engineering model. The computer-implemented method further includes obtaining, by the one or more hardware processors, first one or more geometry data associated with one or more historical products. The geometry data associated with each historical product are corresponding to each experimental data of the one or more experimental data obtained from the machine.

The computer-implemented method further includes computing, by the one or more hardware processors, first one or more geometrical parameters, based on the first one or more geometry data associated with the one or more historical products, by a geometry model. The first one or more geometrical parameters comprises at least one of: first single-valued geometrical parameters and first spatial distribution-based geometrical parameters.

The computer-implemented method further includes computing, by the one or more hardware processors, second one or more geometrical parameters, based on second one or more geometry data associated with the one or more products, by the geometry model. The second one or more geometrical parameters comprises at least one of: second single-valued geometrical parameters and second spatial distribution-based geometrical parameters.

The computer-implemented method further includes determining, by the one or more hardware processors, the one or more defect regions in at least one of: the one or more products and the one or more historical products, based on at least one of: the one or more computed statistical features associated with the one or more defect types and locations, the first one or more geometrical parameters, and the second one or more geometrical parameters, by a machine learning model.

In an embodiment, computing, by the geometry model, the first one or more geometrical parameters based on the first one or more geometry data associated with the one or more historical products, comprises: (a) obtaining, by the one or more hardware processors, the first one or more geometry data associated with the one or more historical products, in one or more formats, (b) generating, by the one or more hardware processors, a three dimensional mesh for the first one or more geometry data associated with the one or more historical products, (c) computing, by the one or more hardware processors, the first one or more geometrical parameters for the first one or more geometry data associated with the one or more historical products, (d) storing, by the one or more hardware processors, data associated with the first one or more geometrical parameters of the first one or more geometry data associated with the one or more historical products, in a database, (e) determining, by the one or more hardware processors, whether each of the first one or more geometrical parameters uniquely identifies each of the first one or more geometry data associated with the one or more historical products, and (f) storing, by the one or more hardware processors, the data associated with the first one or more geometrical parameters for each of the first geometry data associated with the one or more historical products when each of the first one or more geometrical parameters uniquely identifies each of the one or more geometry data associated with the one or more historical products.

The one or more formats comprises at least one of: an initial graphics exchange specification (IGES) format, a stereolithography (STL) format, a standard for the exchange of product data (STEP) format, and a computer aided design (CAD) format. The first one or more geometry data associated with the one or more historical products, are obtained at the geometry model in computer aided design model. The first one or more geometrical parameters comprises at least one of: the first single-valued geometrical parameters and the first spatial distribution-based geometrical parameters.

In another embodiment, computing, by the geometry model, the first one or more geometrical parameters based on the first one or more geometry data associated with the one or more historical products, further comprises computing, by the one or more hardware processors, third one or more geometrical parameters when each of the first one or more geometrical parameters is distinct from each of the first one or more geometry data associated with the one or more historical products.

In yet another embodiment, the first spatial distribution-based geometrical parameters of the first one or more geometrical parameters, are computed based on the three dimensional mesh, by: (a) computing, by the one or more hardware processors, a bounding box for each of the first one or more geometry data associated with the one or more historical products, (b) dividing, by the one or more hardware processors, the computed bounding box into one or more regions, (c) computing, by the one or more hardware processors, the first spatial distribution-based geometrical parameters for each region of the one or more regions, and (d) storing, by the one or more hardware processors, data associated with the first spatial distribution-based geometrical parameters for each geometry data of the first one or more geometry data associated with the one or more historical products. In an embodiment, a size of the one or more regions is based on a number of divisions of the bounding box in at least three directions.

In yet another embodiment, the first single-valued geometrical parameters for each geometry data of the one or more first geometry data associated with the one or more historical products, are computed based on at least one of: the three dimensional mesh generated for the first one or more geometry data associated with the one or more historical products, and the first spatial distribution-based geometrical parameters computed for each geometry data of the first one or more geometry data associated with the one or more historical products. In an embodiment, data associated with the computed first single-valued geometrical parameters, are stored in the database.

In yet another embodiment, the computer-implemented method further comprises computing, by the geometry model, a similarity index between the first one or more geometry data associated with the one or more historical products, and the second one or more geometry data associated with the one or more products.

In yet another embodiment, computing the similarity index between the first one or more geometry data associated with the one or more historical products, and the second one or more geometry data associated with the one or more products, comprises: (a) obtaining, by the one or more hardware processors, the first one or more geometry data associated with the one or more historical products, and the second one or more geometry data associated with the one or more products, at the geometry model, (b) computing, by the one or more hardware processors, the first one or more geometrical parameters and the second one or more geometrical parameters, based on at least one of: the first one or more geometry data associated with the one or more historical products and the second one or more geometry data associated with the one or more products, (c) storing, by the one or more hardware processors, data associated with at least one of: the first single-valued geometrical parameters and the first spatial distribution-based geometrical parameters, for the first one or more geometry data associated with the one or more historical products, and the second single-valued geometrical parameters and the second spatial distribution-based geometrical parameters, for the second one or more geometry data associated with the one or more products, (d) computing, by the one or more hardware processors, the similarity index between the one or more historical products and the one or more products, based on the at least one of: the first single-valued geometrical parameters stored for the first one or more geometry data associated with the one or more historical products, and the second single-valued geometrical parameters stored for the second one or more geometry data associated with the one or more products, (e) selecting, by the one or more hardware processors, at least one historical product among the one or more historical products similar to the one or more products, (f) computing, by the one or more hardware processors, the similarity index between the selected at least one historical product and the one or more products, based on the at least one of: the first spatial distribution-based geometrical parameters and the second spatial distribution-based geometrical parameters applied between the selected at least one historical product and the one or more current products, and (g) determining, by the one or more hardware processors, a historical product similar to the one or more products based on the computed similarity index between the selected at least one historical product and the one or more products.

The second one or more geometrical parameters comprises at least one of: second single-valued geometrical parameters and second spatial distribution-based geometrical parameters. The similarity index between the one or more historical products and the one or more products, is computed based on Euclidean distance.

In yet another embodiment, the at least one of: the first one or more geometrical parameters and the second one or more geometrical parameters, comprises at least one of: surface-to-volume, mass, crinkliness, compactness, volume of at least one of; the one or more historical products and the one or more products, bounding box volume of at least one of; the one or more historical products and the one or more products, and principal moment in the at least three directions.

In yet another embodiment, the computer-implemented method further comprises training the machine learning model on data associated with the first spatial distribution-based geometrical parameters, and the one or more defect types and locations, of the one or more historical products, by: (a) obtaining, by the one or more hardware processors, the data associated with the first spatial distribution-based geometrical parameters, and the one or more defect types and locations, of the one or more historical products, (b) determining, by the one or more hardware processors, a correlation between the data associated with the first spatial distribution-based geometrical parameters and the one or more defect types and locations, of the one or more historical products, and (c) training, by the one or more hardware processors, the machine learning model based on the correlation between the first spatial distribution-based geometrical parameters and the one or more defect types and locations, of the one or more historical products.

In yet another embodiment, determining, by the machine learning model, the one or more defect regions in at least one of: the one or more products and the one or more historical products, comprises: (a) obtaining, by the one or more hardware processors, the second one or more geometrical parameters computed for the second one or more geometry data associated with the one or more products, at the machine learning model, (b) comparing, by the one or more hardware processors, the second one or more geometrical parameters computed for the second one or more geometry data associated with the one or more products, with determined data associated with the correlation between the first spatial distribution-based geometrical parameters and the one or more defect types and locations, of the one or more historical products, and (c) determining, by the one or more hardware processors, the one or more defect regions in the one or more products, based on the comparison between the second one or more geometrical parameters computed for the second one or more geometry data associated with the one or more products, with the determined data associated with the correlation between the first spatial distribution-based geometrical parameters and the one or more defect types and locations, of the one or more historical products.

In yet another embodiment, the machine learning model is configured to determine quality of the one or more products based on the first one or more geometry data associated with the one or more historical products.

In yet another embodiment, the machine learning model is configured to provide optimized parameters of one or more components of at least one of: the one or more products and the one or more historical products, to reduce defects based on at least one of: the one or more components, the first one or more geometry data associated with the one or more historical products, and the data associated with the one or more defect types and locations.

In yet another embodiment, (a) the recipe data comprise a first plurality of parameters that is set for the machine to manufacture the one or more historical products, (b) the one or more measured parameters comprises a second plurality of parameters that is measured from the machine by one or more sensors, (c) the data associated with the one or more defect types and locations, are obtained by at least one of: visual inspection, a non-destructive system including X-ray, and one or more mechanical testing systems, and (d) the metadata comprise at least one of: an identity of the one or more historical products, an identity of the machine, and timestamps.

In one aspect, a computer-implemented system for determining one or more defect regions of one or more products in a manufacturing process, is disclosed. The computer-implemented system comprises one or more hardware processors and a memory. The memory is coupled to the one or more hardware processors. The memory comprises a set of program instructions in form of a plurality of subsystems, configured to be executed by the one or more hardware processors. The plurality of subsystems comprises a data obtaining subsystem, a feature computing subsystem, a parameter computing subsystem, and a defect determining subsystem.

The data obtaining subsystem is configured to obtain one or more experimental data from a machine. The one or more experimental data comprise at least one of: recipe data, one or more measured parameters, data associated with one or more defect types and locations, and metadata.

The feature computing subsystem is configured to compute one or more statistical features based on the one or more experimental data obtained from the machine, by a feature engineering model.

The data obtaining subsystem is further configured to obtain first one or more geometry data associated with one or more historical products. Each geometry data associated with each historical product are corresponding to each experimental data of the one or more experimental data obtained from the machine.

The parameter computing subsystem is configured to compute first one or more geometrical parameters based on the first one or more geometry data associated with the one or more historical products, by a geometry model. The first one or more geometrical parameters comprises at least one of: first single-valued geometrical parameters and first spatial distribution-based geometrical parameters.

The parameter computing subsystem is further configured to compute second one or more geometrical parameters based on second one or more geometry data associated with the one or more products, by the geometry model. The second one or more geometrical parameters comprises at least one of: second single-valued geometrical parameters and second spatial distribution-based geometrical parameters.

The defect determining subsystem is configured to determine the one or more defect regions in at least one of: the one or more products and the one or more historical products, based on at least one of: the one or more computed statistical features associated with the one or more defect types and locations, the first one or more geometrical parameters, and the second one or more geometrical parameters, by a machine learning model.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 9A is a tabular representation depicting the first geometrical parameters and the second geometrical parameters computed for the one or more historical products and the one or more products, respectively, in accordance with an embodiment of the present disclosure;

FIG. 9B is a tabular representation depicting a similarity index computed for the first one or more geometry data associated with the one or more historical products and the second one or more geometry data associated with the one or more products, in accordance with an embodiment of the present disclosure:

Figure 1:
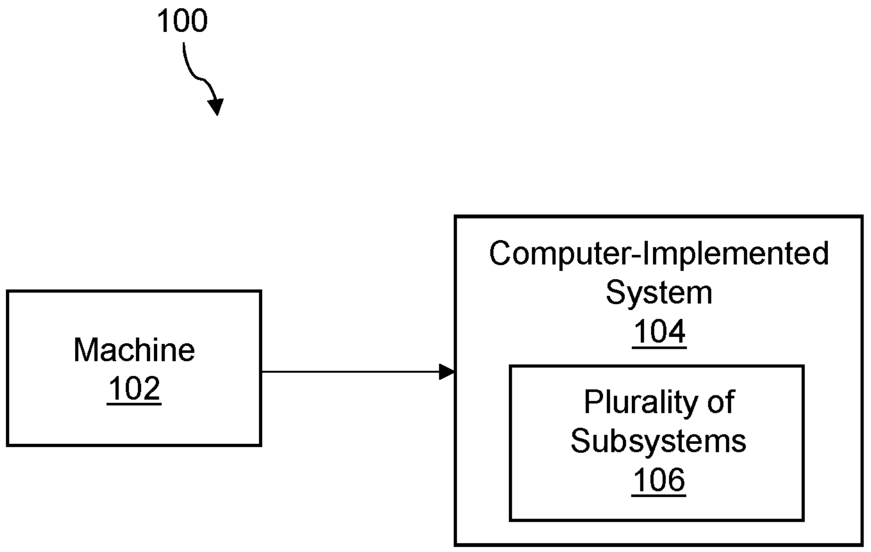
FIG. 1 is a block diagram of a computer-implemented system for determining one or more defect regions of one or more products in a manufacturing process by integrating geometry data associated with the one or more products with a machine learning model, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

FIG. 1 is a block diagram 100 of a computer-implemented system 104 for determining one or more defect regions of one or more products in a manufacturing process by integrating geometry data associated with the one or more products with a machine learning model, in accordance with an embodiment of the present disclosure. In an embodiment, the manufacturing process may include a die casting process. The block diagram 100 includes a machine 102 (e.g., a low pressure die casting (LPDC) machine), and the computer-implemented system 104. The computer-implemented system 104 includes a plurality of subsystems 106.

The computer-implemented system 104 is configured to obtain one or more experimental data from the machine 102. In an embodiment, the one or more experimental data include at least one of: recipe data, one or more measured parameters, data associated with one or more defect types and locations, and metadata.

The computer-implemented system 104 is further configured to compute one or more statistical features including at least one of: mean, median, standard deviation, mean average deviation, and the like, based on the one or more experimental data obtained from the machine 102, by a feature engineering model. The feature engineering model is configured to transform the one or more raw experimental data into the one or more statistical features associated with the one or more experimental data that are used for the machine learning model. The computer-implemented system 104 is further configured to obtain first one or more geometry data associated with the one or more historical products. In an embodiment, each geometry data associated with each historical product are corresponding to each experimental data of the one or more experimental data obtained from the machine 102.

The computer-implemented system 104 is further configured to compute first one or more geometrical parameters, based on the first one or more geometry data associated with the one or more historical products, by a geometry model. In an embodiment, the first one or more geometrical parameters includes at least one of: first single-valued geometrical parameters and first spatial distribution-based geometrical parameters.

The computer-implemented system 104 is further configured to compute second one or more geometrical parameters, based on second one or more geometry data associated with the one or more products (i.e., one or more new products to be manufactured), by the geometry model. In an embodiment, the second one or more geometrical parameters includes at least one of: second single-valued geometrical parameters and second spatial distribution-based geometrical parameters.

The computer-implemented system 104 is further configured to determine the one or more defect regions in at least one of: the one or more products (i.e., the one or more new products) and the one or more historical products, based on at least one of: the one or more computed statistical features associated with the one or more defect type and locations, the first one or more geometrical parameters, and the second one or more geometrical parameters, by the machine learning model (i.e., an artificial intelligence model). In an embodiment, the machine learning model may be at least one of: a linear regression model, a logistic regression model, a decision tree model, a support vector machine model, and the like.

In an embodiment, the computer-implemented system 104 may be hosted on a central server including at least one of: a cloud server, a remote server, and the like. In another embodiment, the computer-implemented system 104 as the central server may obtain at least one of: the experimental data from the machine 102, the first one or more geometry data associated with the one or more historical products, and the second one or more geometry data associated with the one or more products, through a network (not shown).

The computer-implemented system 104 as the central server may further process the at least one of: the one or more experimental data, the first one or more geometry data, and the second one or more geometry data, with above mentioned methods to determine the one or more defect regions of the one or more products (i.e., the one or more new products and the one or more historical products) in the manufacturing process. In an embodiment, the network may be at least one of: a Wireless-Fidelity (Wi-Fi) connection, a hotspot connection, a Bluetooth connection, a local area network (LAN), a wide area network (WAN), any other wireless network, and the like.

Figure 2:
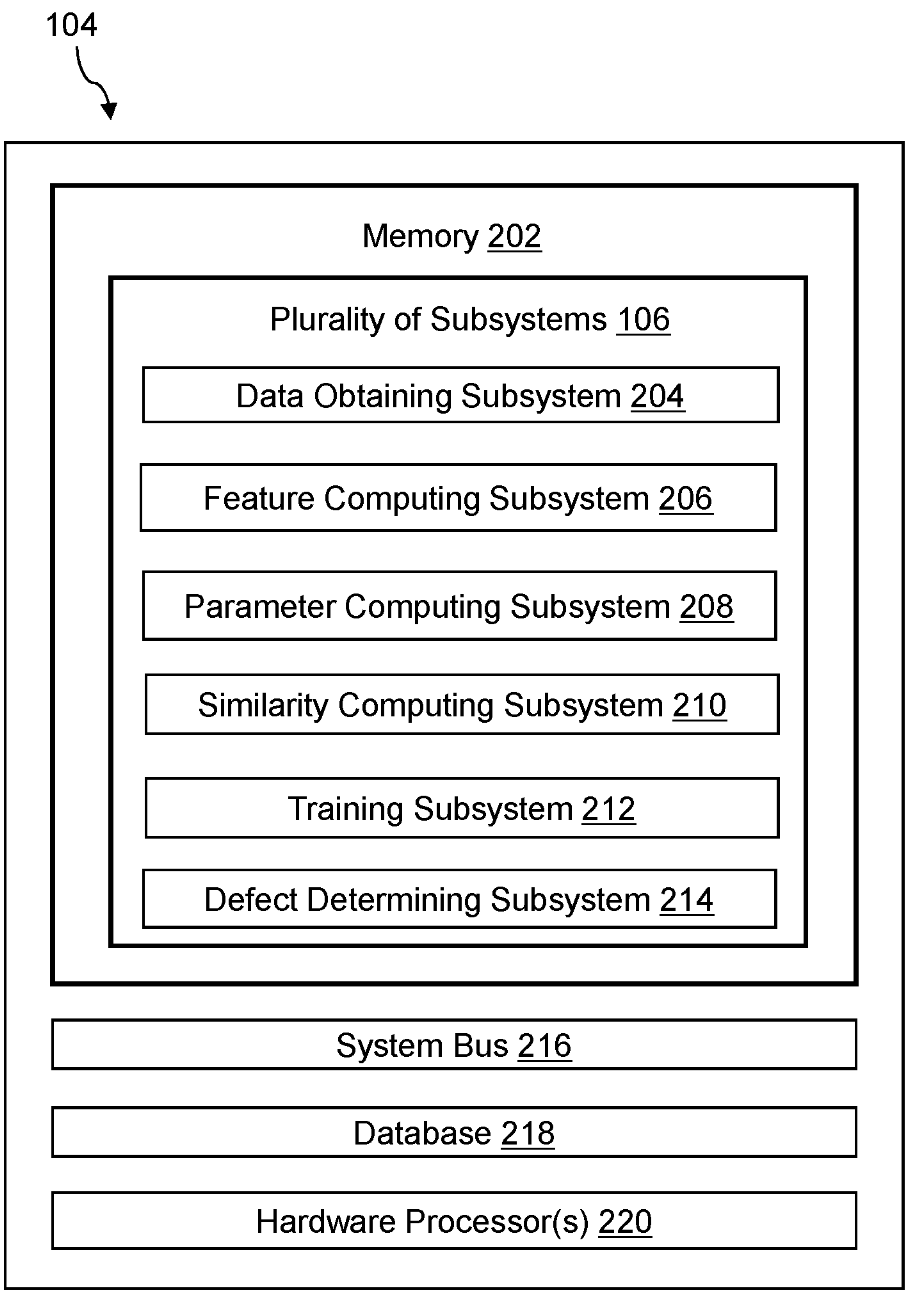
FIG. 2 is a detailed view of the computer-implemented system, such as those shown in FIG. 1, in accordance with an embodiment of the present disclosure.

FIG. 2 is a detailed view of the computer-implemented system 104, such as those shown in FIG. 1, in accordance with an embodiment of the present disclosure. The computer-implemented system 104 includes one or more hardware processor(s) 220. The computer-implemented system 104 further includes a memory 202 coupled to the one or more hardware processor(s) 220. The memory 202 includes a set of program instructions in form of the plurality of subsystems 106.

The one or more hardware processor(s) 220, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 202 includes the plurality of subsystems 106 stored in the form of executable program which instructs the one or more hardware processor(s) 220 via a system bus 216 to perform the above-mentioned method steps. The plurality of subsystems 106 includes following subsystems: a data obtaining subsystem 204, a feature computing subsystem 206, a parameter computing subsystem 208, a similarity computing subsystem 210, a training subsystem 212, and a defect determining subsystem 214.

Computer memory elements may include any suitable memory device(s) for storing data and executable program, such as read only memory, random access memory, erasable programmable read only memory, electronically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the one or more hardware processor(s) 220.

The plurality of subsystems 106 includes the data obtaining subsystem 204 that is communicatively connected to the one or more hardware processor(s) 220. The data obtaining subsystem 204 is configured to obtain the one or more experimental data from the machine 102. In an embodiment, the one or more experimental data include at least one of: the recipe data 322, the one or more measured parameters 324, the data associated with the one or more defect types and locations 326, and the metadata 328.

In an embodiment, the recipe data 322 include a first plurality of parameters including at least one of: pressure, temperature, flow rate, and the like, which are set for the machine 102 to manufacture the one or more historical products. The one or more measured parameters 324 include a second plurality of parameters including at least one of: pressure, temperature, flow rate, and the like, which are measured from the machine 102 by one or more sensors. The data associated with one or more defect types and locations 326, are obtained by at least one of: visual inspection, a non-destructive system including X-ray, and one or more mechanical testing systems. The metadata 328 include at least one of: an identity of the one or more historical products, an identity of the machine 102, and timestamps.

The plurality of subsystems 106 further includes the feature computing subsystem 206 that is communicatively connected to the one or more hardware processor(s) 220. The feature computing subsystem 206 is configured to compute the one or more statistical features based on the one or more experimental data obtained from the machine 102, by the feature engineering model. The feature engineering model is configured to transform the one or more raw experimental data into the one or more statistical features associated with the one or more experimental data that are used for the machine learning model.

The data obtaining subsystem 204 is further configured to obtain the first one or more geometry data associated with the one or more historical products. In an embodiment, each geometry data associated with each historical product are corresponding to each experimental data of the one or more experimental data obtained from the machine 102.

The plurality of subsystems 106 further includes the parameter computing subsystem 208 that is communicatively connected to the one or more hardware processor(s) 220. The parameter computing subsystem 208 is configured to compute the first one or more geometrical parameters, based on the first one or more geometry data associated with the one or more historical products, by the geometry model. In an embodiment, the first one or more geometrical parameters includes at least one of: the first single-valued geometrical parameters and the first spatial distribution-based geometrical parameters.

For computing the first geometrical parameters based on the first one or more geometry data associated with the one or more historical products, the parameter computing system 208 is configured to obtain the first one or more geometry data associated with the one or more historical products, in one or more formats. In an embodiment, the one or more formats includes at least one of: an initial graphics exchange specification (IGES) format, a stereolithography (STL) format, a standard for the exchange of product data (STEP) format, and a computer aided design (CAD) format. In an embodiment, the first one or more geometry data associated with the one or more historical products, are obtained in computer aided design (CAD) model.

The parameter computing system 208 is further configured to generate a three dimensional mesh for the first one or more geometry data associated with the one or more historical products. The parameter computing system 208 is further configured to compute the first one or more geometrical parameters for the first one or more geometry data associated with the one or more historical products. The parameter computing system 208 is further configured to store/maintain the first one or more geometrical parameters of the first one or more geometry data associated with the one or more historical products, in a table.

The parameter computing system 208 is further configured to determine whether each of the first one or more geometrical parameters uniquely identifies each of the first one or more geometry data associated with the one or more historical products. The parameter computing system 208 is further configured to store data associated with the first one or more geometrical parameters for each of the geometry data associated with the one or more historical products, when each of the first one or more geometrical parameters uniquely identifies each of the first one or more geometry data. The parameter computing system 208 is further configured to compute new one or more geometrical parameters (i.e., third one or more geometrical parameters), when each of the first one or more geometrical parameters is distinct from each of the first one or more geometry data associated with the one or more historical products.

The parameter computing subsystem 208 is further configured to compute the second one or more geometrical parameters, based on the second one or more geometry data associated with the one or more products (i.e., the one or more new products), by the geometry model. In an embodiment, the second one or more geometrical parameters for the second one or more geometry data associated with the one or more products, is computed using the same process implemented for the computation of the first one or more geometrical parameters for the first one or more geometry data associated with the one or more historical products. In an embodiment, the second one or more geometrical parameters includes at least one of: the second single-valued geometrical parameters and the second spatial distribution-based geometrical parameters.

The plurality of subsystems 106 further includes the similarity computing subsystem 210 that is communicatively connected to the one or more hardware processor(s) 220. The similarity computing subsystem 210 is configured to compute a similarity index between the first one or more geometry data associated with the one or more historical products, and the second one or more geometry data associated with the one or more products, by the geometry model.

For computing the similarity index between the first one or more geometry data associated with the one or more historical products, and the second one or more geometry data associated with the one or more products, the similarity computing subsystem 210 is configured to obtain the first one or more geometry data associated with the one or more historical products, and the second one or more geometry data associated with the one or more products, at the geometry model. The similarity computing subsystem 210 is further configured to compute the first one or more geometrical parameters and the second one or more geometrical parameters, based on at least one of; the first one or more geometry data associated with the one or more historical products and the second one or more geometry data associated with the one or more products, respectively.

The similarity computing subsystem 210 is further configured to store data associated with at least one of: the first single-valued geometrical parameters and the first spatial distribution-based geometrical parameters, for the first one or more geometry data associated with the one or more historical products, and the second single-valued geometrical parameters and the second spatial distribution-based geometrical parameters, for the second one or more geometry data associated with the one or more products.

The similarity computing subsystem 210 is further configured to compute the similarity index between the one or more historical products and the one or more products, based on the at least one of: the first single-valued geometrical parameters stored for the first one or more geometry data associated with the one or more historical products, and the second single-valued geometrical parameters stored for the second one or more geometry data associated with the one or more products. In an embodiment, the similarity index between the one or more historical products and the one or more products, is computed based on Euclidean distance.

The similarity computing subsystem 210 is further configured to select at least one historical product among the one or more historical products similar to the one or more products. The similarity computing subsystem 210 is further configured to compute the similarity index between the selected at least one historical product and the one or more products, based on the at least one of: the first spatial distribution-based geometrical parameters and the second spatial distribution-based geometrical parameters applied between the selected at least one historical product and the one or more current products. The similarity computing subsystem 210 is further configured to determine a historical product similar to the one or more products based on the computed similarity index between the selected at least one historical product and the one or more products.

In an embodiment, the at least one of: the first one or more geometrical parameters and the second one or more geometrical parameters, includes at least one of: surface-to-volume, mass, crinkliness, compactness, volume of at least one of: the one or more historical products and the one or more products, bounding box volume of at least one of: the one or more historical products and the one or more products, and principal moment in the at least three directions.

The plurality of subsystems 106 further includes the training subsystem 212 that is communicatively connected to the one or more hardware processor(s) 220. The training subsystem 212 is configured to train the machine learning model on data associated with the first spatial distribution-based geometrical parameters, and the one or more defect types and locations 326.

For training the machine learning model on the data associated with the first spatial distribution-based geometrical parameters, and the one or more defect types and locations 326, the training subsystem 212 is configured to obtain the data associated with the first spatial distribution-based geometrical parameters, and the one or more defect types and locations 326, of the one or more historical products. The training subsystem 212 is further configured to determine a correlation between the data associated with the first spatial distribution-based geometrical parameters and the one or more defect types and locations 326, of the one or more historical products. The training subsystem 212 is further configured to train the machine learning model based on the correlation between the first spatial distribution-based geometrical parameters and the one or more defect types and locations 326, of the one or more historical products. In an embodiment, the machine learning model may be a critical region prediction model.

The plurality of subsystems 106 further includes the defect determining subsystem 214 that is communicatively connected to the one or more hardware processor(s) 220. The defect determining subsystem 214 is configured to determine the one or more defect regions in at least one of: the one or more products (i.e., the one or more new products), and the one or more historical products, based on at least one of: the one or more computed statistical features associated with the one or more defect type and locations, the first one or more geometrical parameters, and the second one or more geometrical parameters, by the machine learning model.

For determining the one or more defect regions in at least one of: the one or more products (i.e., the one or more new products) and the one or more historical products, the defect determining subsystem 214 is configured to obtain the second one or more geometrical parameters computed for the second one or more geometry data associated with the one or more products, at the machine learning model. The defect determining subsystem 214 is further configured to compare the second one or more geometrical parameters computed for the second one or more geometry data associated with the one or more products, with determined data associated with the correlation between the first spatial distribution-based geometrical parameters and the one or more defect types and locations 326, of the one or more historical products.

The defect determining subsystem 214 is further configured to determine the one or more defect regions in at least one of: the one or more products and the one or more historical products, based on the comparison between the second one or more geometrical parameters computed for the second one or more geometry data associated with the one or more products, with the determined data associated with the correlation between the first spatial distribution-based geometrical parameters and the one or more defect types and locations 326, of the one or more historical products.

Figure 11:
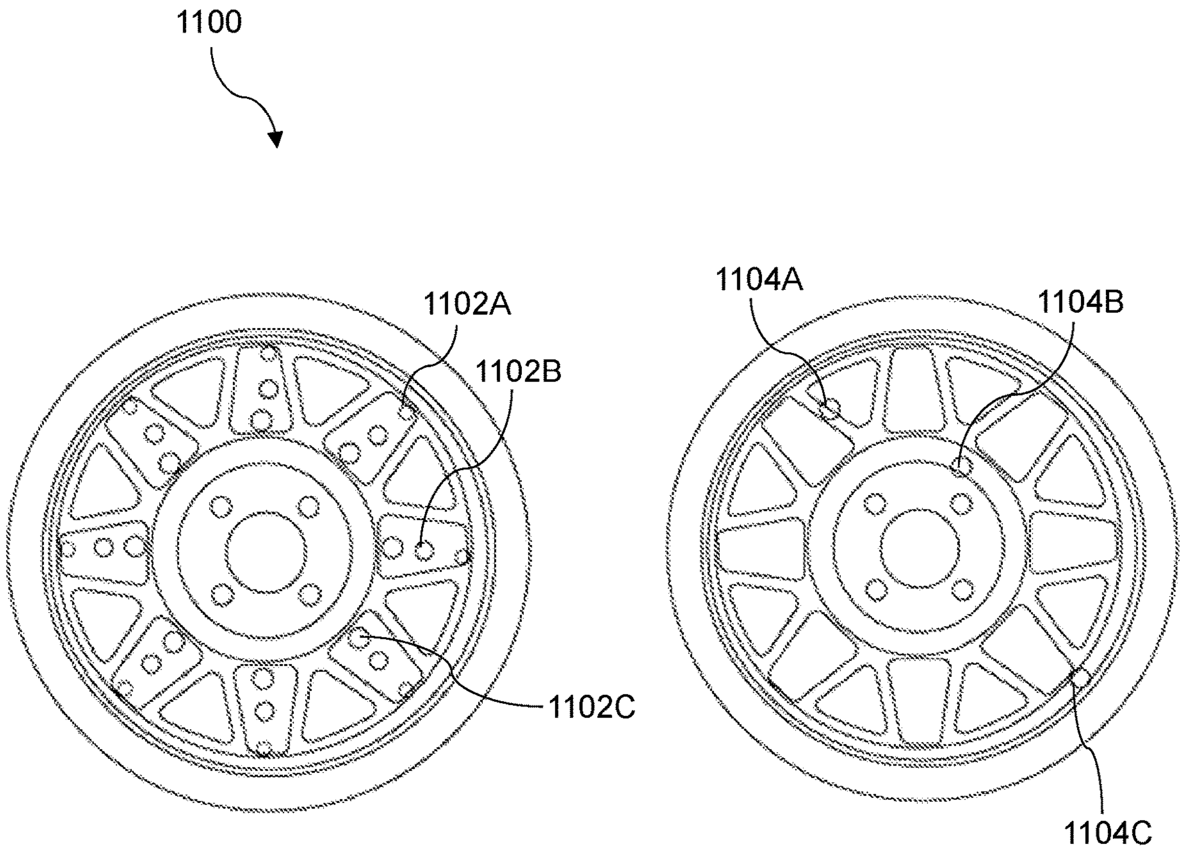
FIG. 11 is an exemplary representation depicting the one or more historical products along with one or more cooling channels and the data associated with the one or more defect types and locations, in accordance with an embodiment of the present disclosure.

In an embodiment, the machine learning model further includes at least one of: a quality prediction model and a prescription model. The quality prediction model is configured to determine quality of the one or more products based on the first one or more geometry data associated with the one or more historical products. The prescription model is configured to provide optimized parameters of one or more components (i.e., cooling channels, as shown in FIG. 11) of at least one of: the one or more products and the one or more historical products, to reduce defects based on at least one of: the one or more components, the first one or more geometry data associated with the one or more historical products, and the data associated with the one or more defect types and locations 326.

Figure 3:
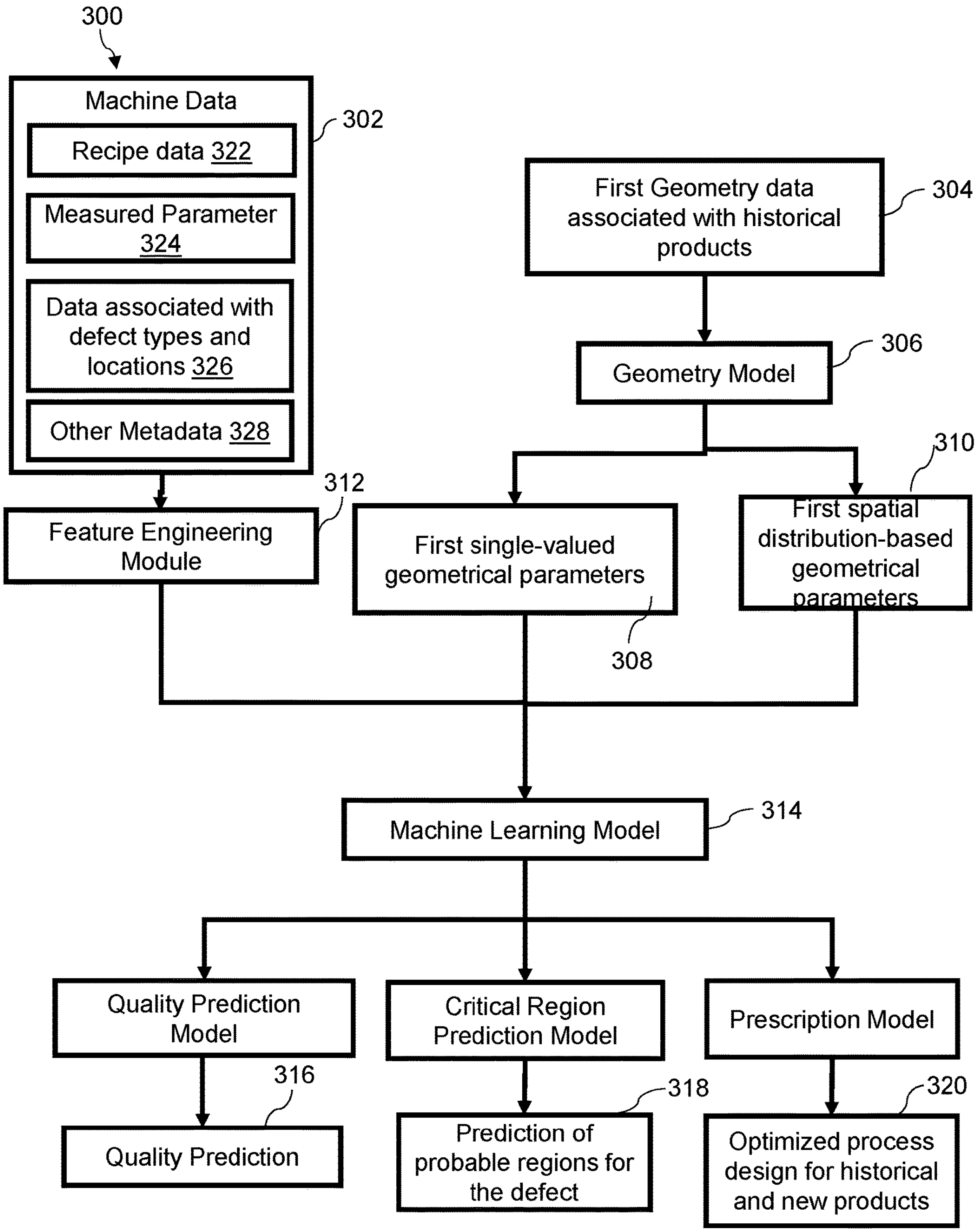
FIG. 3 is an overall process flow for determining the one or more defect regions of the one or more products in the manufacturing process by integrating the geometry data associated with the one or more products with the machine learning model, such as those shown in FIG. 1, in accordance with an embodiment of the present disclosure.

FIG. 3 is an overall process flow 300 for determining the one or more defect regions of the one or more products in the manufacturing process by integrating the geometry data associated with the one or more products with the machine learning model, such as those shown in FIG. 1, in accordance with an embodiment of the present disclosure. At step 302, the one or more experimental data are obtained from the machine 102. In an embodiment, the one or more experimental data include at least one of: the recipe data 322, the one or more measured parameters 324, the data associated with one or more defect types and locations 326, and the metadata 328.

At step 304, the first geometry data associated with the one or more historical products, are inputted at the geometry model, as shown in step 306. At step 308, the geometry model is configured to compute the first one or more geometrical parameters. The first one or more geometrical parameters includes the first single-valued geometrical parameters (as shown in step 308), and the first spatial distribution-based geometrical parameters (as shown in step 310).

At step 312, the feature engineering model is configured to collect the one or more experimental data for computing the one or more statistical features associated with the one or more experimental data. At step 314, the one or more statistical features associated with the one or more experimental data, the first single-valued geometrical parameters, and the first spatial distribution-based geometrical parameters, associated with the one or more historical products, are inputted at the machine learning model. In an embodiment, the machine learning model obtains the one or more statistical features associated with the one or more experimental data, which helps the feature engineering model to determine a hidden pattern behind the first one or more geometry data. In addition, the second single-valued geometrical parameters, and the second spatial distribution-based geometrical parameters, associated with the one or more products (i.e., the one or more new products), are also inputted at the machine learning model.

At step 316, the quality prediction model of the machine learning model is configured to determine the quality of the one or more products based on at least one of: the data associated with the one or more defect types and locations 326 of the one or more historical products, and the first one or more geometry data associated with the one or more historical products.

At step 318, the critical region prediction model of the machine learning model is configured to determine the one or more probable regions for defect that may occur in at least one of: the one or more products and the one or more historical products, based on at least one of: the one or more computed statistical features associated with the one or more defect type and locations, the first one or more geometrical parameters, and the second one or more geometrical parameters. At step 320, the prescription model of the machine learning model is configured to provide the recommendation on the optimized process design for at least one of; the one or more products and the one or more historical products, based on the first one or more geometry data and the corresponding recipe data 322 associated with the one or more historical products.

Figure 4:
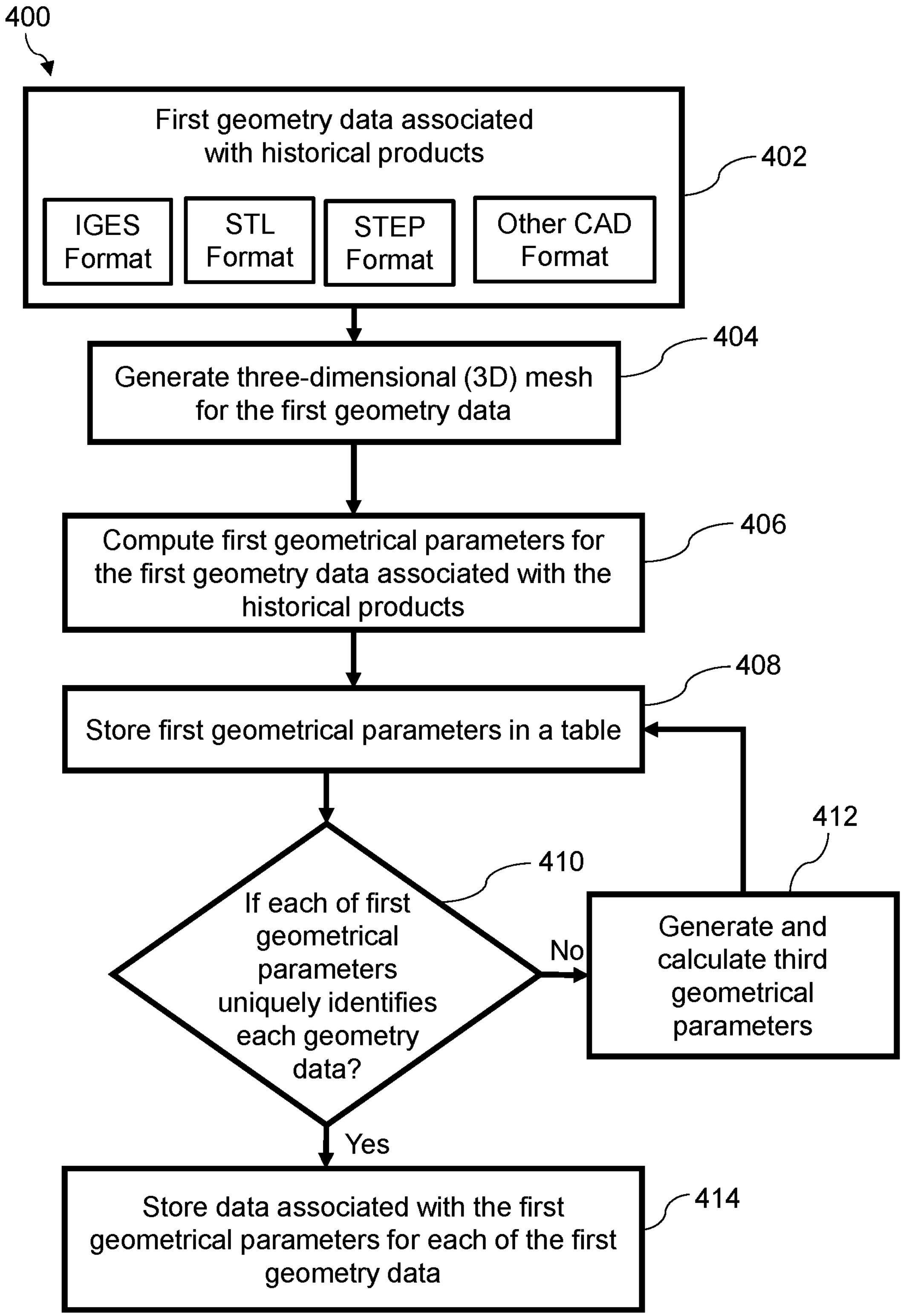
FIG. 4 is a process flow for computing first geometrical parameters based on first one or more geometry data associated with one or more historical products, in accordance with an embodiment of the present disclosure.

FIG. 4 is a process flow 400 for computing the first geometrical parameters based on the first one or more geometry data associated with the one or more historical products, in accordance with an embodiment of the present disclosure. At step 402, the first one or more geometry data associated with the one or more historical products, are obtained at the geometry model. In an embodiment, the first one or more geometry data may be obtained at the geometry model in the one or more formats. In another embodiment, the one or more formats of the first one or more geometry data includes at least one of: the initial graphics exchange specification (IGES) format, the stereolithography (STL) format, the standard for the exchange of product data (STEP) format, and the computer aided design (CAD) format. In an embodiment, the first one or more geometry data associated with the one or more historical products, is obtained at the geometry model in computer aided design model.

At step 404, the three dimensional mesh is generated for the first one or more geometry data associated with the one or more historical products. At step 406, the first one or more geometrical parameters is computed for the first one or more geometry data associated with the one or more historical products. At step 408, data associated with the first one or more geometrical parameters of the first one or more geometry data associated with the one or more historical products, are stored in the database 218. In an embodiment, the data associated with the first one or more geometrical parameters of the first one or more geometry data associated with the one or more historical products, are maintained/stored in a tabular representation. At step 410, the parameter computing subsystem 208 is configured to determine whether each of the first one or more geometrical parameters uniquely identifies/describes each of the first one or more geometry data associated with the one or more historical products.

At step 412, the parameter computing system 208 is configured to compute the new one or more geometrical parameters (i.e., the third one or more geometrical parameters) when each of the first one or more geometrical parameters is distinct from each of the first one or more geometry data associated with the one or more historical products. At step 414, the parameter computing system 208 is configured to store the data associated with the first one or more geometrical parameters for each of the geometry data associated with the one or more historical products, when each of the first one or more geometrical parameters uniquely identifies each of the first one or more geometry data.

Figure 5:
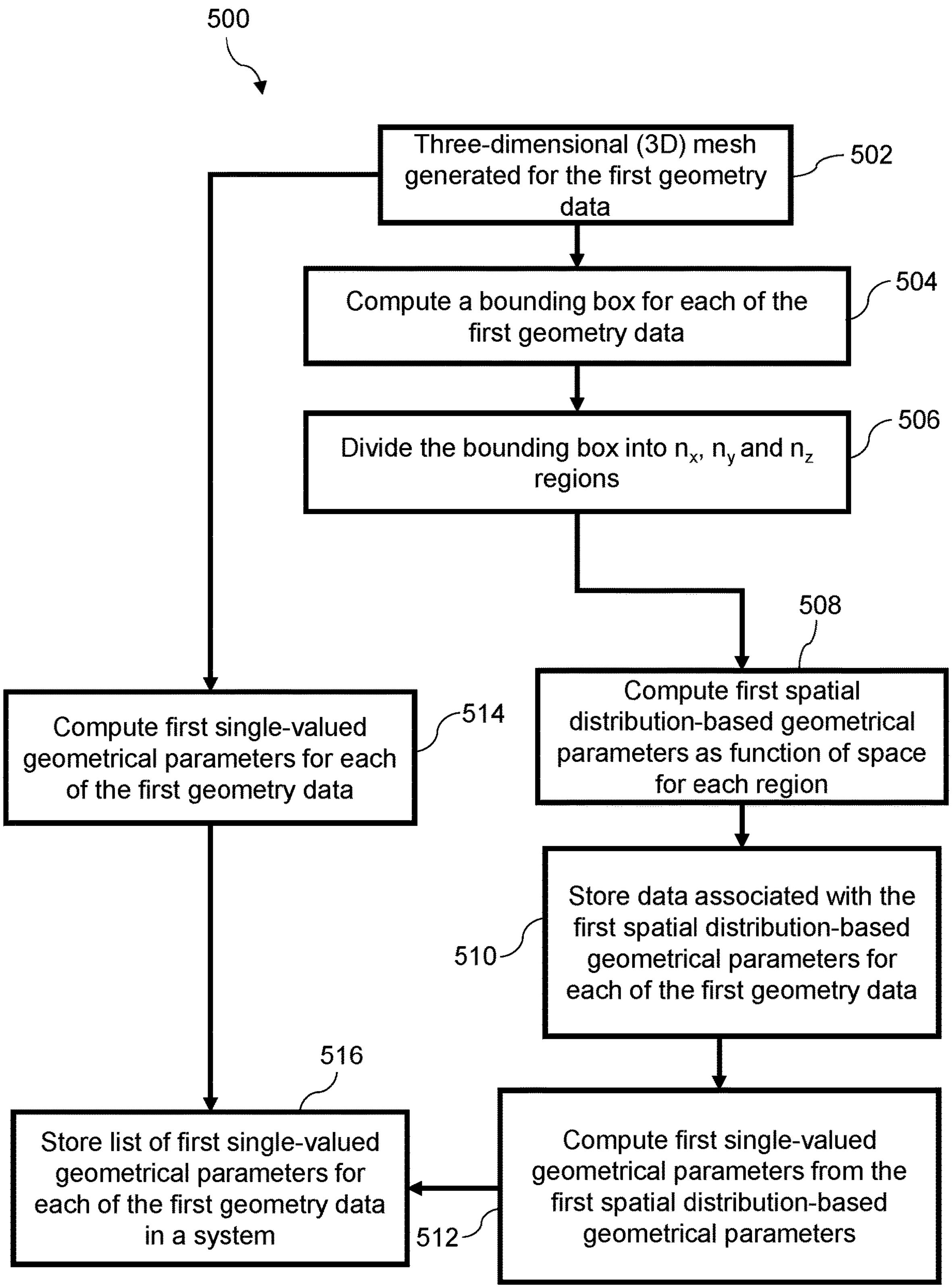
FIG. 5 is a process flow for computing first spatial distribution-based geometrical parameters and first single-valued geometrical parameters, in accordance with an embodiment of the present disclosure.

FIG. 5 is a process flow 50) for computing first spatial distribution-based geometrical parameters and first single-valued geometrical parameters, based on three dimensional mesh generated for the first one or more geometry data associated with the one or more historical products, in accordance with an embodiment of the present disclosure. At step 502, the three dimensional mesh is generated based on the first one or more geometry data associated with the one or more historical products. At step 504, a bounding box is computed for each of the first one or more geometry data associated with the one or more historical products. At step 506, the computed bounding box is divided into one or more regions. In an embodiment, a size of the one or more regions is based on a number of divisions (i.e., $n_x$, $n_y$, $n_z$) in at least three directions (i.e., X, Y, Z directions) of the bounding box. Totally, $n_x \times n_y \times n_z$ regions are created for the first one or more geometry data associated with the one or more historical products.

At step 508, the first spatial distribution-based geometrical parameters is computed as a function of space for each region of the one or more regions. At step 510, data associated with the first spatial distribution-based geometrical parameters are stored for each geometry data of the first one or more geometry data associated with the one or more historical products. In an embodiment, the first single-valued geometrical parameters are computed in two ways. In first way, the first single-valued geometrical parameters are computed from the first spatial distribution-based geometrical parameters computed for each geometry data of the first one or more geometry data associated with the one or more historical products, as shown in step 512. In second way, the first single-valued geometrical parameters are computed based on the three dimensional mech generated for each geometry data of the first geometry data associated with the one or more historical products, as shown in step 514. At step 516, the first single-valued geometrical parameters are stored in the database 218.

Figure 6A:
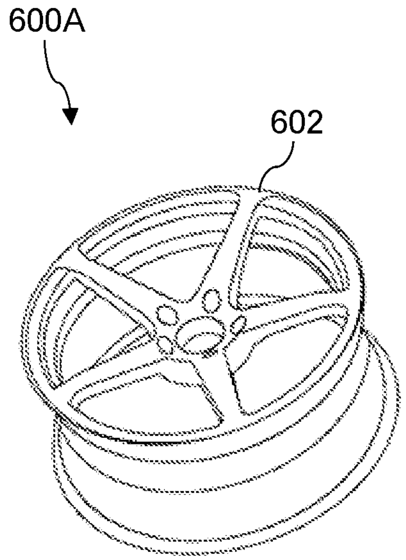
FIGS. 6A-6D are exemplary representations depicting that the first geometrical parameters are computed based on the first one or more geometry data associated with a wheel product, in accordance with an embodiment of the present disclosure.
Figure 6B:
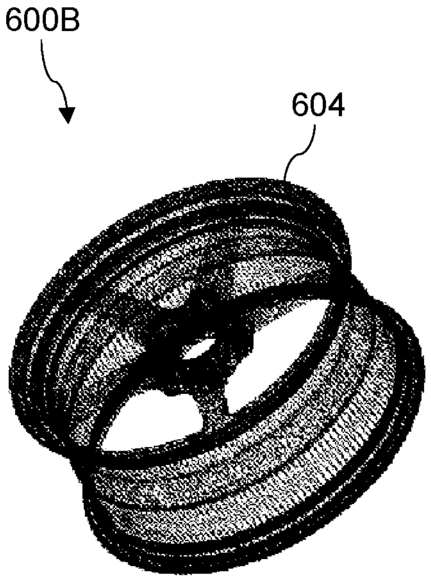
Figure 6C:
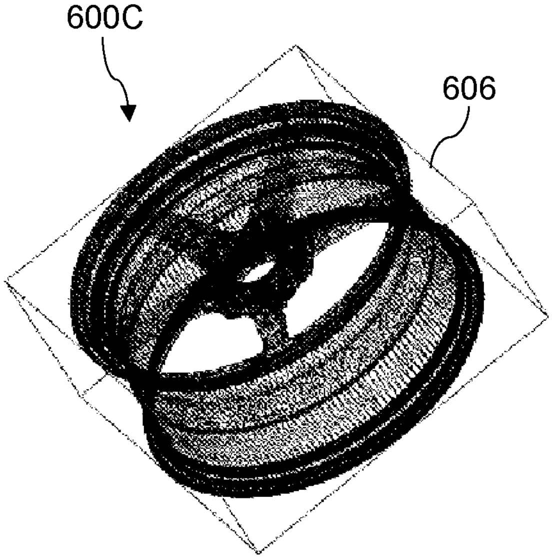
Figure 6D:
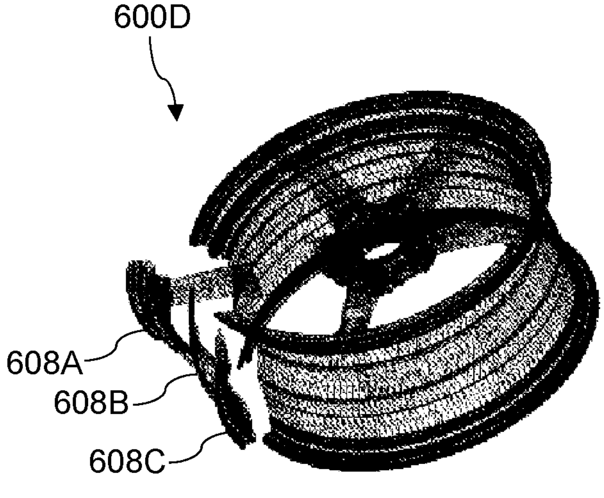

FIGS. 6A-6D are exemplary representations depicting that the first geometrical parameters are computed based on the first one or more geometry data associated with a wheel product, in accordance with an embodiment of the present disclosure. FIG. 6A depicts the wheel product 602. FIG. 6B depicts the three dimensional mesh 604 generated for the first one or more geometry data associated with the wheel product 602. FIG. 6C depicts the bounding box 606 around the wheel product 602. The bounding box 606 is divided into the one or more regions 608A-C in the at least three directions (X, Y, Z directions). The first geometrical parameters are computed for each region of the one or more regions 608A-C. In an embodiment, each of the first mathematical parameters is computed for total of nine regions for the given wheel product 602.

Figure 7:
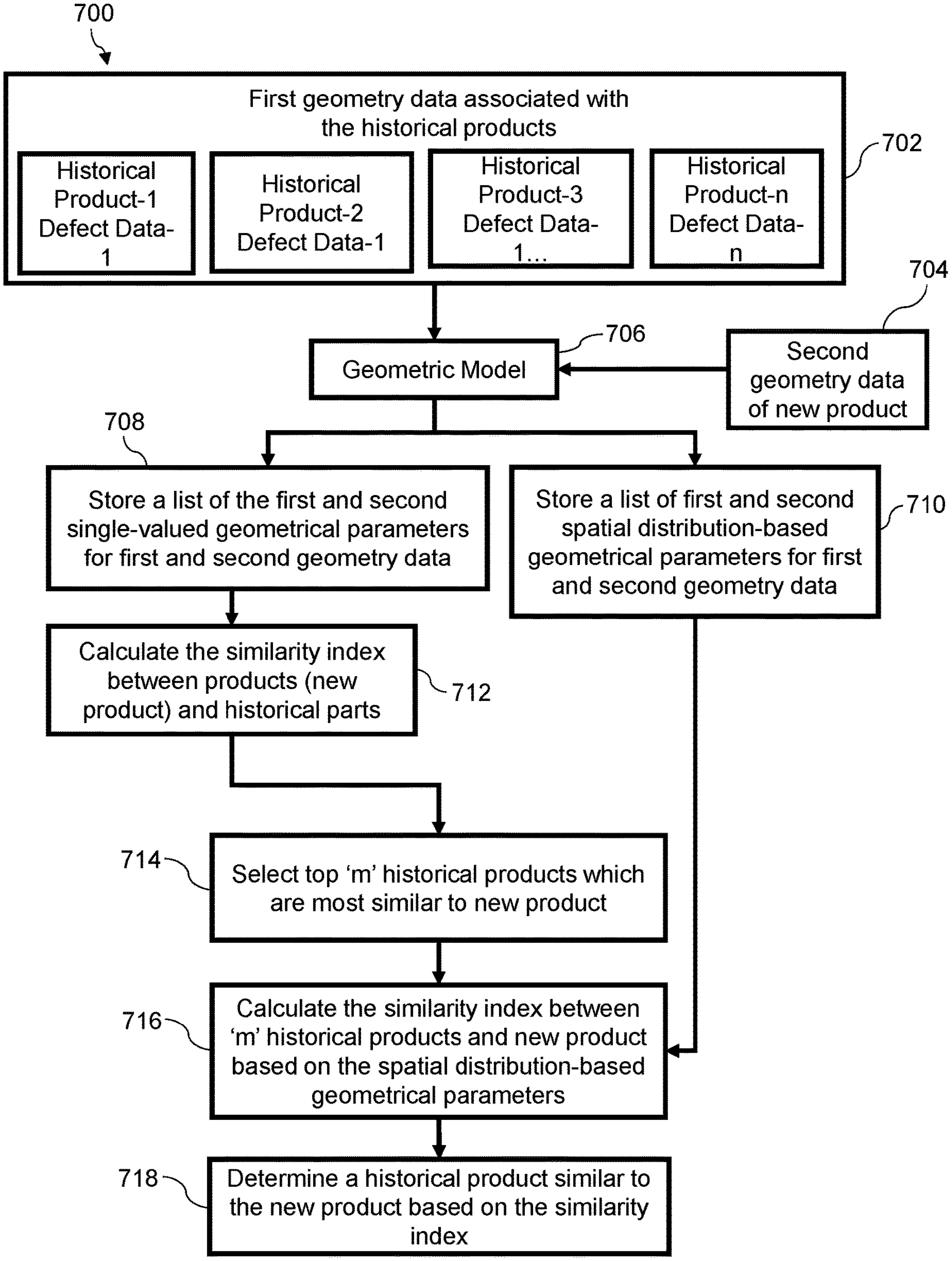
FIG. 7 is a process flow for determining similarities between the one or more first geometry data associated with the one or more historical products, and second one or more geometry data associated with one or more products (i.e., one or more new products), in accordance with an embodiment of the present disclosure.
Figure 8A:
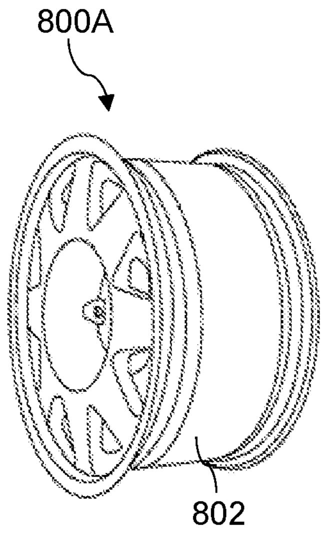
FIGS. 8A-8D are exemplary representations depicting the similarities between the one or more historical products and the one or more products, in accordance with an embodiment of the present disclosure.
Figure 8B:
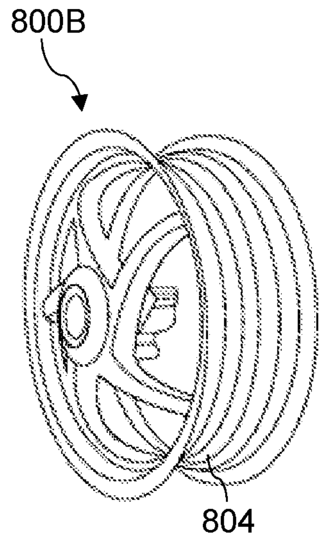
Figure 8C:
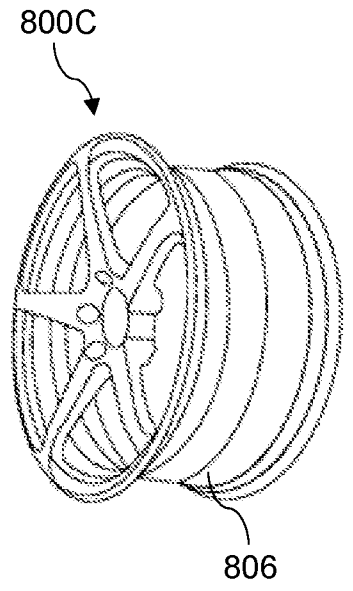
Figure 8D:
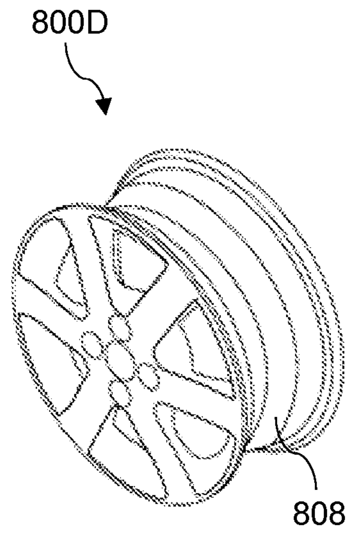

FIG. 7 is a process flow 700 for determining similarities between the one or more first geometry data associated with the one or more historical products, and the second one or more geometry data associated with one or more products (i.e., the one or more new products), in accordance with an embodiment of the present disclosure. The first one or more geometry data associated with the one or more historical products (shown in step 702), and the second one or more geometry data associated with the one or more products (shown in step 704), are inputted at the geometry model, as shown in step 706. The first one or more geometrical parameters and the second one or more geometrical parameters are computed, based on at least one of: the first one or more geometry data associated with the one or more historical products and the second one or more geometry data associated with the one or more products.

At step 708, data associated with at least one of: the first single-valued geometrical parameters and the first spatial distribution-based geometrical parameters, for the first one or more geometry data associated with the one or more historical products, are stored. At step 710, the second single-valued geometrical parameters and the second spatial distribution-based geometrical parameters, for the second one or more geometry data associated with the one or more products, are stored.

At step 712, the similarity index between the one or more historical products and the one or more products, is computed based on the at least one of: the first single-valued geometrical parameters stored for the first one or more geometry data associated with the one or more historical products, and the second single-valued geometrical parameters stored for the second one or more geometry data associated with the one or more products. At step 714, the at least one historical product among the one or more historical products similar to the one or more products, is selected.

At step 716, the similarity index between the selected at least one historical product and the one or more products, is computed based on the at least one of: the first spatial distribution-based geometrical parameters and the second spatial distribution-based geometrical parameters applied between the selected at least one historical product and the one or more current products. At step 718, the historical product similar to the one or more products is determined based on the computed similarity index between the selected at least one historical product and the one or more products.

FIGS. 8A-8D are exemplary representations depicting the similarities between the one or more historical products 802-806 and the one or more products 808, in accordance with an embodiment of the present disclosure. For example, the similarities between the historical products 802-806 and the one or more products (i.e., the one or more new products) 808 are computed based on the first and second geometrical parameters computed for the first and second geometry data associated with the one or more historical products 802-806 and the one or more products 808.

FIG. 9A is a tabular representation 900A depicting the first geometrical parameters and the second geometrical parameters computed for the one or more historical products and the one or more products, respectively, in accordance with an embodiment of the present disclosure. The tabular representation 900A depicts the geometrical parameters including at least one of: surface-to-volume (S/V) 902, mass 904, crinkliness 906, compactness 908, volume 910 of at least one of: the one or more historical products and the one or more products, bounding box volume of at least one of: the one or more historical products and the one or more products, and principal moment 912, 914 in the at least three directions.

In an embodiment, the surface-to-volume (S/V) 902 is a ratio of a surface area to a volume. The mass 904 is the volume of the product multiplied by the density of material of the product. The crinkliness 906 is the surface area of the product divided by the surface area of a sphere having same volume of the product. The compactness 908 is a ratio of volume squared divided by cube of the surface area. The volume or BB_volume 910 is the ratio of the volume of the product and volume of the bounding box 406 of the product. The PM_X, PM_Y and PM_Z is the principal moment 912, 914 in X, Y and Z direction, respectively.

FIG. 9B is a tabular representation 900B depicting the similarity index computed for the first one or more geometry data associated with the one or more historical products and the second one or more geometry data associated with the one or more products, in accordance with an embodiment of the present disclosure. FIG. 9B depicts that the new product 808 is similar to the first historical product 802 as the similarity index between the new product and the first historical product is 0.95, which is a closest value to 1.

Figure 10:
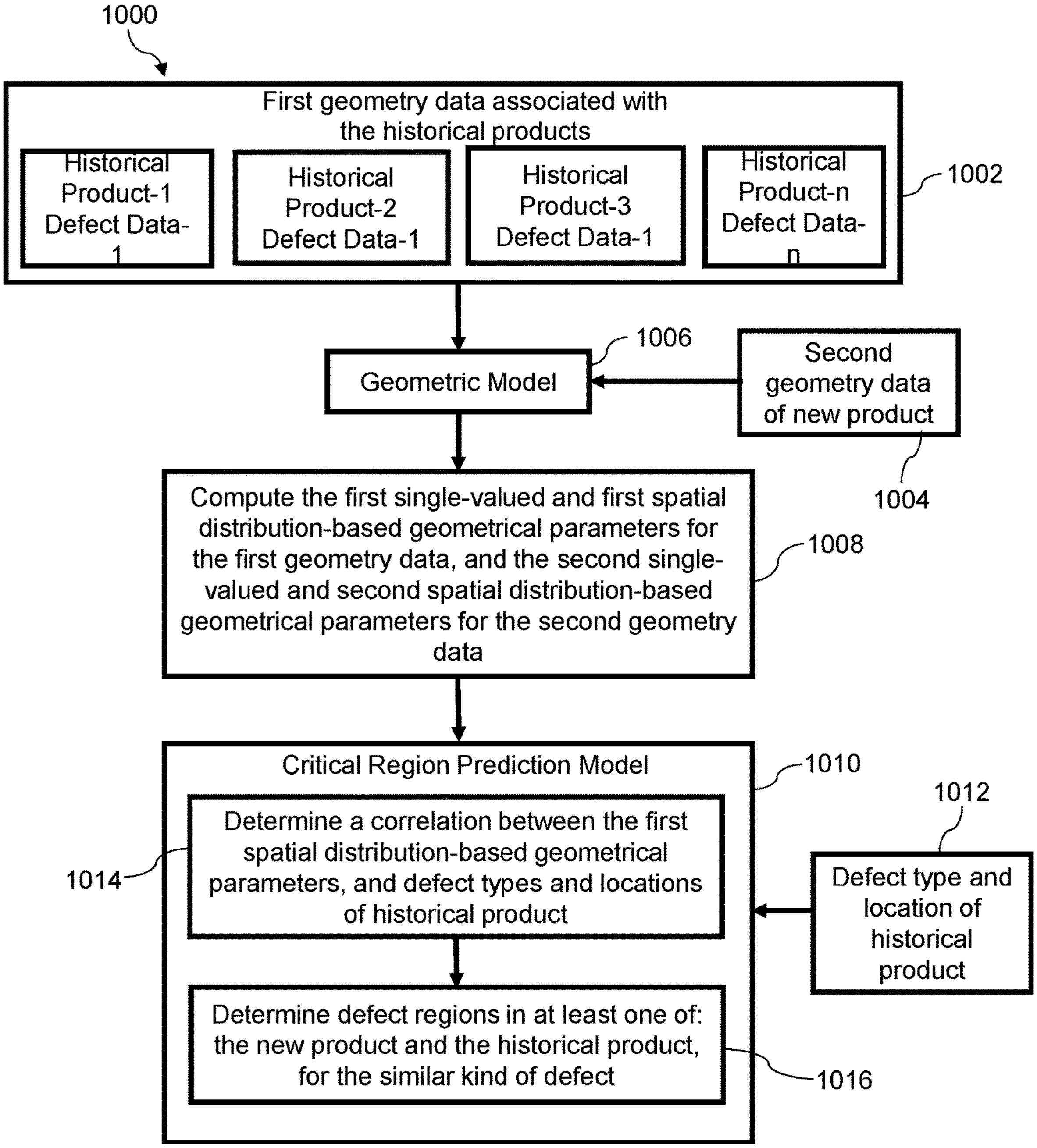
FIG. 10 is a process flow for determining the one or more defect regions of the one or more products in the manufacturing process, in accordance with an embodiment of the present disclosure.

FIG. 10 is a process flow 1000 for determining the one or more defect regions of the one or more products in the manufacturing process, in accordance with an embodiment of the present disclosure. The first one or more geometry data associated with the one or more historical products (shown in step 1002), and the second one or more geometry data associated with the one or more products (shown in step 1004), are inputted at the geometry model, as shown in step 1006.

At step 1008, the first single-valued and first spatial distribution-based geometrical parameters for the first geometry data, and the second single-valued and second spatial distribution-based geometrical parameters for the second geometry data, are computed by the geometry model. At step 1010, the computed first single-valued and spatial distribution-based geometrical parameters, and the second single-valued and spatial distribution-based geometrical parameters, are inputted at the machine learning model (e.g., the critical region prediction model). At step 1012, the one or more statistical features associated with the one or more defect types and locations 326 of the one or more historical products, is provided to the machine learning model.

At step 1014, the correlation between the data associated with the first spatial distribution-based geometrical parameters and the one or more defect types and locations 326, of the one or more historical products, is determined by the machine learning model (e.g., the critical region prediction model). At step 1016, the one or more defect regions in at least one of: the one or more products (i.e., the one or more new products) and the one or more historical products, for the similar kind of defect.

FIG. 11 is an exemplary representation depicting the one or more historical products along with one or more cooling channels 1102A-C and the data associated with the one or more defect locations 1104A-C, in accordance with an embodiment of the present disclosure, in accordance with an embodiment of the present disclosure. The first geometric data associated with the one or more historical products, one or more components of the machine 102, the one or more cooling channels 1102A-C, and the one or more defect locations 1104A-C, are used to recommend an optimized recipe data 322 for the one or more historical products. The geometry data associated with the one or more cooling channels 1102A-C (i.e., in the CAD model) includes data associated with one or more locations, shape and size of the one or more cooling channels 1102A-C.

In an embodiment, the data associated with the defect locations are used to compare locations of the one or more cooling channels 1102A-C with defect locations 1104A-C. The computed first single valued and the spatial distribution-based distance geometrical parameters, between the one or more cooling channels 1102A-C and the data associated with the defect locations 1104A-C, are used to estimate an impact of the one or more cooling channels 1102A-C on the one or more defect locations 1104A-C. The mapping between the one or more defect locations 1104A-C and the one or more cooling channels 1102A-C, along with weightage, is used as an input to the machine learning model. The machine learning model determines an optimized range of the one or more cooling channels 1102A-C to reduce the defect based on the locations one or more cooling channels 1102A-C.

For example, for a particular set of machine parameters (i.e., recipe data), defect at a location 1104A is comparatively higher than a defect at other locations. To reduce the defect at these locations, the cooling channel 1102B has comparatively higher weightage based on the spatial distance between the cooling channel 1102B and the defect 1104B. The machine learning model changes the parameters of the cooling channel 1102B based on the weightage and corresponding cooling channels 1102A and 1102C are adjusted. Therefore, the optimized parameters are suggested by the machine learning model to reduce the defect at particular locations.

In addition, the machine 102 includes the one or more components to manufacture a particular product. The relation of the spatial location and geometry of the other components with the defect in the products have high correlation. Therefore, it is necessary to create linkage of the geometries with product and defect locations which helps the machine learning model to optimize the process to reduce the defect.

Figure 12:
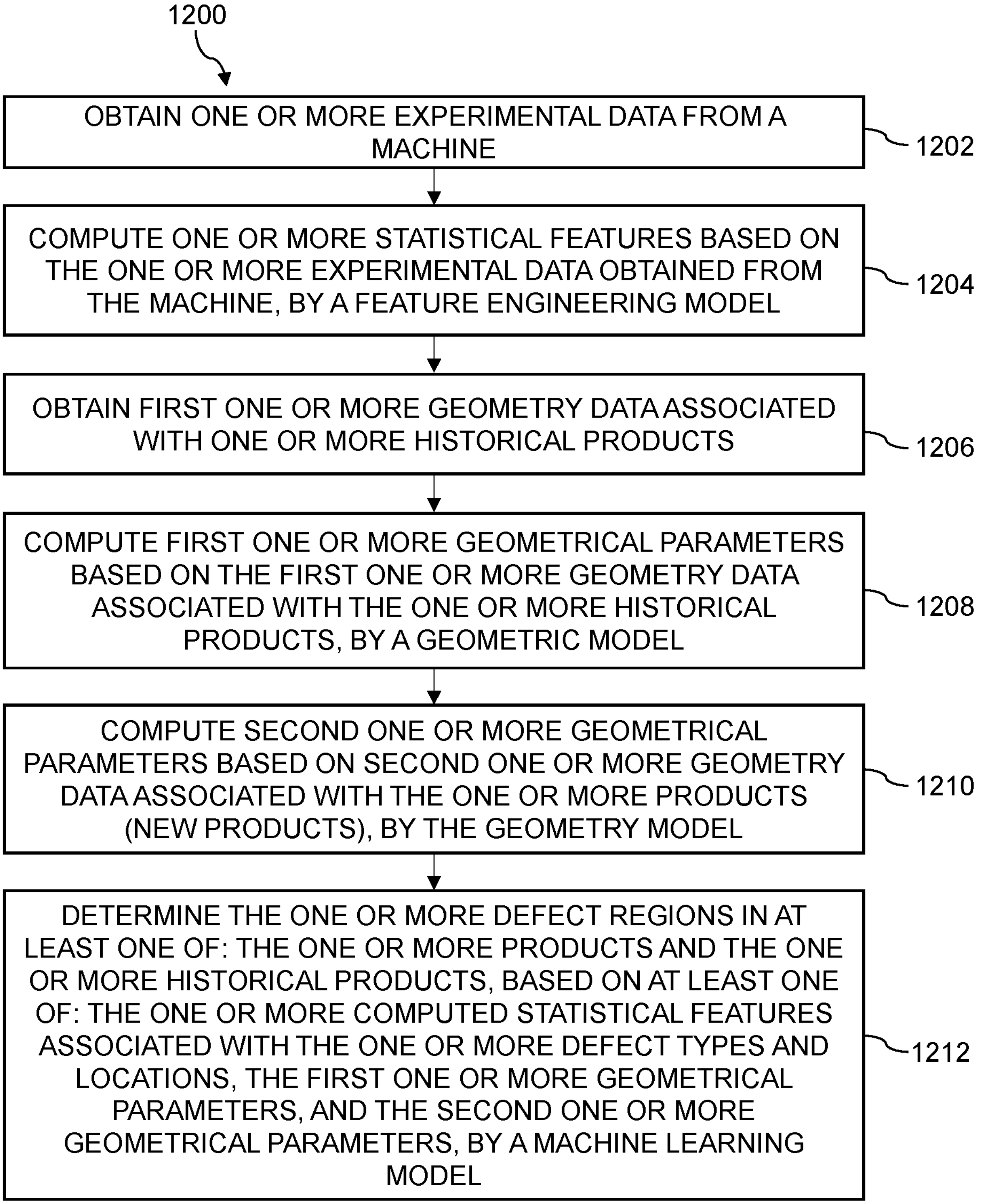
FIG. 12 is a flow chart depicting a computer-implemented method for determining the one or more defect regions of the one or more products in a manufacturing process by integrating the geometry data associated with the one or more products with the machine learning model, in accordance with an embodiment of the present disclosure.

FIG. 12 is a flow chart depicting a computer-implemented method 1200 for determining the one or more defect regions of the one or more products in a manufacturing process by integrating the geometry data associated with the one or more products with the machine learning model, in accordance with an embodiment of the present disclosure. At step 1202, the one or more experimental data are obtained from the machine 102. In an embodiment, the one or more experimental data include at least one of: the recipe data 322, the one or more measured parameters 324, the data associated with one or more defect types and locations 326, and the metadata 328.

At step 1204, the one or more statistical features is computed based on the one or more experimental data obtained from the machine 102, by a feature engineering model. At step 1206, the first one or more geometry data associated with one or more historical products, are obtained. In an embodiment, each geometry data associated with each historical product are corresponding to each experimental data of the one or more experimental data obtained from the machine 102.

At step 1208, the first one or more geometrical parameters is computed based on the first one or more geometry data associated with the one or more historical products, by the geometry model. In an embodiment, the first one or more geometrical parameters includes at least one of: the first single-valued geometrical parameters and the first spatial distribution-based geometrical parameters. At step 1210, the second one or more geometrical parameters is computed based on the second one or more geometry data associated with the one or more products, by the geometry model. In an embodiment, the second one or more geometrical parameters comprises at least one of: the second single-valued geometrical parameters and the second spatial distribution-based geometrical parameters.

At step 1212, the one or more defect regions in at least one of: the one or more products and the one or more historical products, is determined based on at least one of: the one or more computed statistical features associated with the one or more defect types and locations 326, the first one or more geometrical parameters, and the second one or more geometrical parameters, by the machine learning model.

The present invention has following advantages. The present invention is configured to integrate the geometric data of the products in the artificial intelligence model developed for the manufacturing process. The present invention is configured to compute the single-valued geometrical parameters and the spatial distribution-based geometrical parameters for the computer-aided design (CAD) model. The present invention is configured to utilize the geometry data to classify the product geometry and to provide better inside information of the product geometry by having the same information. The geometric data of the one or more historical products are used for the AI model for better prediction.

The present invention is configured to utilize the first one or more geometric data of the one or more historical products geometry and recommends/prescribes the recipe for the second one or more geometry data of the one or more products (i.e., the one or more new products), based on the similarity between the one or more historical products and the one or more new products. The present invention is used for detecting the one or more probable defect regions by determining the correlation between the data associated with the one or more defect types and locations 326 and the first one or more geometrical parameters computed for the one or more historical products. The correlation is further extended to the one or more new products and to detect the one or more probable defect regions.

The machine learning model is configured to obtain the weightage of the one or more cooling channels 1102A-C and the defect locations 1104A-C, based on the spatial location along with the recipe data 322, the one or more measured parameters 324, the data associated with the defect types and locations 326, and the meta data 328. Based on the weightage and other parameters, the machine learning model is configured to provide the optimizes set of the cooling channel parameters to reduce the defects.

The geometric data in the machine learning model may be used in one or more applications including at least one of: supply chain, automatic generation of bills for material of the products, generation of a machine code (i.e., CNC code) to manufacture the product, and the like. The machine learning model is configured to provide required outputs by integrating the geometry data of the products. The output of the machine learning model may be at least one of: the quality of the products, estimation of manufacturing cost, production planning, and the like.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, and the like. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, an apparatus, or a device.

The medium can be an electronic, a magnetic, an optical, an electromagnetic, an infrared, or a semiconductor system (or an apparatus or a device) or a propagation medium. Examples of a computer-readable medium include a semiconductor or solid-state memory, a magnetic tape, a removable computer diskette, a random-access memory (RAM), a read-only memory (ROM), a rigid magnetic disk and an optical disk. Current examples of optical disks include a compact disk-read only memory (CD-ROM), a compact disk-read/write (CD-R/W) and a DVD.

Input/output (I/O) devices (including but not limited to keyboards, displays, pointing devices, and the like) can be coupled to the computer-implemented system 104 either directly or through intervening I/O controllers. Network adapters may also be coupled to the computer-implemented system 104 to enable a data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer-implemented system 104 in accordance with the embodiments herein. The computer-implemented system 104 herein comprises at least one of: a processor or a central processing unit (CPU). The CPUs are interconnected via the system bus 216 to various devices such as a random-access memory (RAM), read-only memory (ROM), and an input/output (I/O) adapter. The I/O adapter can connect to peripheral devices, such as disk units and tape drives, or other program storage devices that are readable by the computer-implemented system 104. The computer-implemented system 104 can read the inventive instructions on the program storage devices and follow these instructions to execute the methodology of the embodiments herein.

The computer-implemented system 104 further includes a user interface adapter that connects a keyboard, a mouse, a speaker, a microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, a printer, or a transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, and the like. Of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A computer-implemented method for determining one or more defect regions of one or more products in a manufacturing process, the computer-implemented method comprising:

obtaining, by one or more hardware processors, one or more experimental data from a machine, wherein the one or more experimental data comprise at least one of: recipe data, one or more measured parameters, data associated with one or more defect types and locations, and metadata;

computing, by a feature engineering model on the one or more hardware processors, one or more statistical features based on the data associated with one or more defect types and locations of the one or more experimental data obtained from the machine;

obtaining, by the one or more hardware processors, one or more first geometry data associated with one or more historical products, wherein each first geometry data is associated with a respective historical product, and wherein each historical product is associated with corresponding experimental data of the one or more experimental data obtained from the machine;

generating, by the one or more hardware processors, a three dimensional mesh for the one or more first geometry data associated with the one or more historical products;

computing, by a geometry model on the one or more hardware processors, one or more first geometrical parameters, based on the one or more first geometry data associated with the one or more historical products, wherein the one or more first geometrical parameters comprise at least one of: first single-valued geometrical parameters and first spatial distribution-based geometrical parameters, wherein the first spatial distribution-based geometrical parameters represent spatial distribution of geometry across different regions of the one or more historical products;

computing, by the one or more hardware processors, a bounding box for each of the one or more first geometry data associated with the one or more historical products; dividing, by the one or more hardware processors, the computed bounding box into one or more regions, and computing, by the one or more hardware processors, the first spatial distribution-based geometrical parameters for each region of the one or more regions;

computing, by the geometry model on one or more hardware processors, one or more second geometrical parameters, based on one or more second geometry data associated with the one or more products, wherein the one or more second geometrical parameters comprises at least one of: second single-valued geometrical parameters and second spatial distribution-based geometrical parameters;

determining, by the one or more hardware processors running a machine learning model trained using data associated with the one or more historical products, the one or more defect regions of the one or more products, wherein the determining is based on at least one of: the one or more computed statistical features associated with the one or more defect types and locations, the one or more first geometrical parameters, and the one or more second geometrical parameters;

wherein the determining, by the one or more hardware processors, comprises identifying correlations between the first spatial distribution-based geometrical parameters and the one or more defect types and locations of the one or more historical products; determining, by the one or more hardware processors, the one or more defect regions of the one or more products by comparing the one or more second geometrical parameters computed for the one or more second geometry data associated with the one or more products with determined data associated with the correlation between the first spatial distribution-based geometrical parameters and the one or more defect types and locations, of the one or more historical products; and generating, by the one or more hardware processors, optimized parameters for the machine based on the determined one or more defect regions, wherein the optimized parameters are suggested by the machine learning model to reduce defects at one or more locations in the manufacturing process.

2. The computer-implemented method as claimed in claim 1, wherein computing, by the geometry model, the one or more first geometrical parameters based on the one or more first geometry data associated with the one or more historical products, comprises:

obtaining, by the one or more hardware processors, the one or more first geometry data associated with the one or more historical products, in one or more formats, wherein the one or more formats comprises at least one of: an initial graphics exchange specification (IGES) format, a stereolithography (STL) format, a standard for the exchange of product data (STEP) format, and a computer aided design (CAD) format, and wherein the one or more first geometry data associated with the one or more historical products, are obtained at the geometry model in computer aided design model;

computing, by the one or more hardware processors, the one or more first geometrical parameters for the one or more first geometry data associated with the one or more historical products, wherein the one or more first geometrical parameters comprises at least one of: the first single-valued geometrical parameters and the first spatial distribution-based geometrical parameters;

storing, by the one or more hardware processors, data associated with the one or more first geometrical parameters of the one or more first geometry data associated with the one or more historical products, in a database;

determining, by the one or more hardware processors, whether each of the one or more first geometrical parameters uniquely identifies each of the one or more first geometry data associated with the one or more historical products;

computing, by the one or more hardware processors, one or more third geometrical parameters when each of the one or more first geometrical parameters is distinct from each of the one or more first geometry data associated with the one or more historical products; and storing, by the one or more hardware processors, the data associated with the one or more first geometrical parameters for each of the first geometry data associated with the one or more historical products when each of the one or more first geometrical parameters uniquely identifies each of the one or more geometry data associated with the one or more historical products.

3. The computer-implemented method as claimed in claim 1, wherein a size of the one or more regions (608A-C) is based on a number of divisions of the bounding box in at least three directions;

storing, by the one or more hardware processors, data associated with the first spatial distribution-based geometrical parameters for each geometry data of the one or more first geometry data associated with the one or more historical products, wherein the first single-valued geometrical parameters for each geometry data of the one or more first geometry data associated with the one or more historical products, is computed based on at least one of: the three dimensional mesh generated for the one or more first geometry data associated with the one or more historical products, and the first spatial distribution-based geometrical parameters computed for each geometry data of the one or more first geometry data associated with the one or more historical products, and wherein data associated with the computed first single-valued geometrical parameters, are stored in the database.

4. The computer-implemented method as claimed in claim 1, further comprising computing, by the geometry model, a similarity index between the one or more first geometry data associated with the one or more historical products, and the one or more second geometry data associated with the one or more products, wherein computing the similarity index between the one or more first geometry data associated with the one or more historical products, and the one or more second geometry data associated with the one or more products, comprises:

obtaining, by the one or more hardware processors, the one or more first geometry data associated with the one or more historical products, and the one or more second geometry data associated with the one or more products, at the geometry model;

computing, by the one or more hardware processors, the one or more first geometrical parameters and the one or more second geometrical parameters, based on at least one of: the one or more first geometry data associated with the one or more historical products and the one or more second geometry data associated with the one or more products, wherein the one or more second geometrical parameters comprises at least one of: second single-valued geometrical parameters and second spatial distribution-based geometrical parameters;

storing, by the one or more hardware processors, data associated with at least one of: the first single-valued geometrical parameters and the first spatial distribution-based geometrical parameters, for the one or more first geometry data associated with the one or more historical products, and the second single-valued geometrical parameters and the second spatial distribution-based geometrical parameters, for the one or more second geometry data associated with the one or more products;

computing, by the one or more hardware processors, the similarity index between the one or more historical products and the one or more products, based on the at least one of: the first single-valued geometrical parameters stored for the one or more first geometry data associated with the one or more historical products, and the second single-valued geometrical parameters stored for the one or more second geometry data associated with the one or more products, wherein the similarity index between the one or more historical products and the one or more products, is computed based on Euclidean distance;

selecting, by the one or more hardware processors, at least one historical product among the one or more historical products similar to the one or more products;

computing, by the one or more hardware processors, the similarity index between the selected at least one historical product and the one or more products, based on the at least one of: the first spatial distribution-based geometrical parameters and the second spatial distribution-based geometrical parameters applied between the selected at least one historical product and the one or more current products; and determining, by the one or more hardware processors, a historical product similar to the one or more products based on the computed similarity index between the selected at least one historical product and the one or more products.

5. The computer-implemented method as claimed in claim 4, wherein the at least one of: the one or more first geometrical parameters and the one or more second geometrical parameters, comprises at least one of: surface-to-volume, mass, crinkliness, compactness, volume of at least one of: the one or more historical products and the one or more products, bounding box volume of at least one of: the one or more historical products and the one or more products, and principal moment in the at least three directions.

6. The computer-implemented method as claimed in claim 1, further comprising training, by the one or more hardware processors, the machine learning model based on the correlation between the first spatial distribution-based geometrical parameters of the one or more historical products and the one or more defect types and locations of the one or more historical products.

7. The computer-implemented method as claimed in claim 1, wherein the machine learning model is configured to one of:

determine quality of the one or more products based on the one or more first geometry data associated with the one or more historical products, and provide optimized parameters of one or more components of at least one of: the one or more products and the one or more historical products, to reduce defects based on at least one of: the one or more components, the one or more first geometry data associated with the one or more historical products, and the data associated with the one or more defect types and locations.

8. The computer-implemented method as claimed in claim 1, wherein:

the recipe data comprise a first plurality of parameters, wherein the first plurality of parameters is set for the machine to manufacture the one or more historical products, and wherein the first plurality of parameters comprises at least one of: pressure, temperature, and flow rate;

the one or more measured parameters comprises a second plurality of parameters, wherein the second plurality of parameters is measured from the machine by one or more sensors, and wherein the second plurality of parameters comprises at least one of: pressure, temperature, and flow rate;

the data associated with the one or more defect types and locations, are obtained by at least one of: visual inspection, a non-destructive system including X-ray, and one or more mechanical testing systems, and the metadata comprise at least one of: an identity of the one or more historical products, an identity of the machine, and timestamps.

9. A computer-implemented system for determining one or more defect regions of one or more products in a manufacturing process, the computer-implemented system comprising:

one or more hardware processors; and a memory coupled to the one or more hardware processors, wherein the memory comprises a set of program instructions in form of a plurality of subsystems, configured to be executed by the one or more hardware processors, wherein the plurality of subsystems comprises:

a data obtaining subsystem configured to obtain one or more experimental data from a machine, wherein the one or more experimental data comprise at least one of: recipe data, one or more measured parameters, data associated with one or more defect types and locations, and metadata;

a feature computing subsystem configured to compute, by a feature engineering model, one or more statistical features based on the data associated with one or more defect types and locations of the one or more experimental data obtained from the machine;

the data obtaining subsystem configured to obtain one or more first geometry data associated with one or more historical products, wherein each first geometry data is associated with a respective historical product, and wherein each historical product is associated with corresponding experimental data of the one or more experimental data obtained from the machine;

a parameter computing subsystem configured to:

generate, by a geometry model, a three-dimensional mesh for the one or more first geometry data associated with the one or more historical products;

compute, by the geometry model, one or more first geometrical parameters based on the one or more first geometry data associated with the one or more historical products, wherein the one or more first geometrical parameters comprise at least one of: first single-valued geometrical parameters and first spatial distribution-based geometrical parameters, wherein the first spatial distribution-based geometrical parameters represent spatial distribution of geometry across different regions of the one or more historical products;

compute, by the geometry model, a bounding box for each of the one or more first geometry data associated with the one or more historical products;

divide, by the geometry model, the computed bounding box into one or more regions;

compute, by the geometry model, the first spatial distribution-based geometrical parameters for each region of the one or more regions; and compute, by the geometry model, one or more second geometrical parameters based on one or more second geometry data associated with the one or more products, wherein the one or more second geometrical parameters comprises at least one of: second single-valued geometrical parameters and second spatial distribution-based geometrical parameters; and a defect determining subsystem configured to determine, using a machine learning model trained using data associated with the one or more historical products, the one or more defect regions of the one or more products, wherein the determination is based on at least one of: the one or more computed statistical features associated with the one or more defect types and locations, the one or more first geometrical parameters, and the one or more second geometrical parameters wherein the defect determination subsystem is further configured to identify correlations between the first spatial distribution-based geometrical parameters and the one or more defect types and locations of the one or more historical products;

determine, using the machine learning model, the one or more defect regions of the one or more products by comparing the one or more second geometrical parameters computed for the one or more second geometry data associated with the one or more products with data associated with the correlation between the first spatial distribution-based geometrical parameters and the one or more defect types and locations of the one or more historical products; and a parameter generation subsystem configured to generate optimized parameters for the machine based on the determined one or more defect regions, wherein the optimized parameters are suggested by the machine learning model to reduce defects at one or more locations in the manufacturing process.

10. The computer-implemented system as claimed in claim 9, wherein in computing, by the geometry model, the one or more first geometrical parameters based on the one or more first geometry data associated with the one or more historical products, the parameter computing subsystem is configured to:

obtain the one or more first geometry data associated with the one or more historical products, in one or more formats, wherein the one or more formats comprises at least one of: an initial graphics exchange specification (IGES) format, a stereolithography (STL) format, a standard for the exchange of product data (STEP) format, and a computer aided design (CAD) format, and wherein the one or more first geometry data associated with the one or more historical products, are obtained at the geometry model in computer aided design model;

compute the one or more first geometrical parameters for the one or more first geometry data associated with the one or more historical products, wherein the one or more first geometrical parameters comprises at least one of: the first single-valued geometrical parameters and the first spatial distribution-based geometrical parameters;

store the one or more first geometrical parameters of the one or more first geometry data associated with the one or more historical products, in a database;

determine whether each of the one or more first geometrical parameters uniquely identifies each of the one or more first geometry data associated with the one or more historical products;

compute one or more third geometrical parameters when each of the one or more first geometrical parameters is distinct from each of the one or more first geometry data associated with the one or more historical products; and store data associated with the one or more first geometrical parameters for each of the geometry data associated with the one or more historical products when each of the one or more first geometrical parameters uniquely identifies each of the one or more first geometry data associated with the one or more historical products.

11. The computer-implemented system as claimed in claim 9, wherein a size of the one or more regions (608A-C) is based on a number of divisions of the bounding box in at least three directions;

storing data associated with the first spatial distribution-based geometrical parameters for each geometry data of the one or more first geometry data associated with the one or more historical products, wherein the first single-valued geometrical parameters for each geometry data of the one or more first geometry data associated with the one or more historical products, is computed based on at least one of: the three dimensional mesh generated for the one or more first geometry data associated with the one or more historical products, and the first spatial distribution-based geometrical parameters computed for each geometry data of the one or more first geometry data associated with the one or more historical products, and wherein data associated with the computed first single-valued geometrical parameters, are stored in the database.

12. The computer-implemented system as claimed in claim 9, further comprising a similarity computing subsystem configured to compute a similarity index between the one or more first geometry data associated with the one or more historical products, and the one or more second geometry data associated with the one or more products, by the geometry model, wherein in computing the similarity index between the one or more first geometry data associated with the one or more historical products, and the one or more second geometry data associated with the one or more products, the similarity computing subsystem is configured to:

obtain the first one or more geometry data associated with the one or more historical products, and the one or more second geometry data associated with the one or more products, at the geometry model;

compute the one or more first geometrical parameters and the one or more second geometrical parameters, based on at least one of: the one or more first geometry data associated with the one or more historical products and the one or more second geometry data associated with the one or more products, wherein the one or more second geometrical parameters comprises at least one of: second single-valued geometrical parameters and second spatial distribution-based geometrical parameters;

store data associated with at least one of: the first single-valued geometrical parameters and the first spatial distribution-based geometrical parameters, for the one or more first geometry data associated with the one or more historical products, and the second single-valued geometrical parameters and the second spatial distribution-based geometrical parameters, for the one or more second geometry data associated with the one or more products;

compute the similarity index between the one or more historical products and the one or more products, based on the at least one of: the first single-valued geometrical parameters stored for the one or more first geometry data associated with the one or more historical products, and the second single-valued geometrical parameters stored for the one or more second geometry data associated with the one or more products, wherein the similarity index between the one or more historical products and the one or more products, is computed based on Euclidean distance;

select at least one historical product among the one or more historical products similar to the one or more products;

compute the similarity index between the selected at least one historical product and the one or more products, based on the at least one of: the first spatial distribution-based geometrical parameters and the second spatial distribution-based geometrical parameters applied between the selected at least one historical product and the one or more current products; and determine a historical product similar to the one or more products based on the computed similarity index between the selected at least one historical product and the one or more products.

13. The computer-implemented system as claimed in claim 12, wherein the at least one of: the one or more first geometrical parameters and the one or more second geometrical parameters, comprises at least one of: surface-to-volume, mass, crinkliness, compactness, volume of at least one of: the one or more historical products and the one or more products, bounding box volume of at least one of: the one or more historical products and the one or more products, and principal moment in the at least three directions.

14. The computer-implemented system as claimed in claim 9, further comprising a training subsystem configured to train the machine learning model based on the correlation between the first spatial distribution-based geometrical parameters of the one or more historical products and the one or more defect types and locations of the one or more historical products.

15. The computer-implemented system as claimed in claim 9, wherein the machine learning model is configured to at least one of:

determine quality of the one or more products based on the one or more first geometry data associated with the one or more historical products, and provide optimized parameters of one or more components of at least one of: the one or more products and the one or more historical products, to reduce defects based on at least one of: the one or more components, the one or more first geometry data associated with the one or more historical products, and the data associated with the one or more defect types and locations.

16. The computer-implemented system as claimed in claim 9, wherein:

the recipe data comprise a first plurality of parameters, wherein the first plurality of parameters is set for the machine to manufacture the one or more historical products, and wherein the first plurality of parameters comprises at least one of: pressure, temperature, and flow rate;

the one or more measured parameters comprises a second plurality of parameters, wherein the second plurality of parameters is measured from the machine by one or more sensors, and wherein the second plurality of parameters comprises at least one of: pressure, temperature, and flow rate;

the data associated with the one or more defect types and locations, are obtained by at least one of: visual inspection, a non-destructive system including X-ray, and one or more mechanical testing systems, and the metadata comprise at least one of: an identity of the one or more historical products, an identity of the machine, and timestamps.

* * * * *